United States Patent
Pieczka et al.

(10) Patent No.: US 8,172,506 B2
(45) Date of Patent: May 8, 2012

(54) METHOD AND SYSTEM FOR COOLING ENGINE COMPONENTS

(75) Inventors: Rafal Piotr Pieczka, Wodzislaw Slaski (PL); Craig William Higgins, Liberty Township, OH (US); Piotr Edward Kobek, Warsaw (PL); Jan Franciszek Sikorski, Warsaw (PL); Edward Donald Michaels, Mason, OH (US)

(73) Assignee: General Electric Company, Schenectady, NY (US)

( * ) Notice: Subject to any disclaimer, the term of this patent is extended or adjusted under 35 U.S.C. 154(b) by 760 days.

(21) Appl. No.: 12/324,324

(22) Filed: Nov. 26, 2008

(65) Prior Publication Data

US 2010/0129197 A1    May 27, 2010

(51) Int. Cl.
*F03B 11/00* (2006.01)
*F01D 5/14* (2006.01)
*F03D 11/00* (2006.01)
*F04D 31/00* (2006.01)

(52) U.S. Cl. ....................................... 415/115

(58) Field of Classification Search ............... 415/115
See application file for complete search history.

(56) References Cited

U.S. PATENT DOCUMENTS

| | | | |
|---|---|---|---|
| 3,950,950 A * | 4/1976 | Doerner et al. ............... 60/657 |
| 5,143,512 A | 9/1992 | Corsmeier et al. |
| 6,561,758 B2 | 5/2003 | Rinck et al. |
| 6,749,400 B2 | 6/2004 | Dougherty et al. |
| 6,860,722 B2 | 3/2005 | Forrester et al. |
| 7,331,763 B2 | 2/2008 | Higgins et al. |
| 2005/0053460 A1 | 3/2005 | Czachor et al. |
| 2005/0191168 A1 | 9/2005 | Eckert et al. |
| 2007/0140856 A1 | 6/2007 | Albrecht, Jr. et al. |
| 2007/0140864 A1 | 6/2007 | Higgins et al. |

\* cited by examiner

*Primary Examiner* — Michelle Mandala
(74) *Attorney, Agent, or Firm* — David J. Clement, Esq.; Armstrong Teasdale LLP

(57) ABSTRACT

A method and system for a rotatable member of a turbine engine are provided. The rotatable member includes a substantially cylindrical shaft rotatable about a longitudinal axis, and a hub coupled to the cylindrical shaft through a conical shaft portion wherein the conical shaft portion includes a plurality of circumferentially-spaced air passages and wherein at least one of the plurality of air passages includes a non-circular cross section.

17 Claims, 5 Drawing Sheets

METHOD AND SYSTEM FOR COOLING ENGINE COMPONENTS

BACKGROUND OF THE INVENTION

This invention relates generally to turbine engines and, more particularly, to a method and system for maintaining cooling to internal components of turbine engines.

At least some known turbine engine high pressure turbine disks include radially outer rim slots for attaching a plurality of blades to the disk using a dovetail connection. The dimensions of the slots combined with the forces exerted on the rim during various operational loadings tend to shorten the life of the disk. To strengthen the area of the rim that tends to limit the life of the disk, the dimensions of the slots may be modified. However, modification of the dovetail slot shape to increase the strength of the disk can decrease the blade cooling circuit pressure and cooling flow margins to the blades attached at the slots.

In addition, improving the life of the disk by improving the rim makes particulate erosion in forward inner shaft cavity of the disk a new life limiting area. Eliminating the particulate erosion in the forward inner shaft cavity of the disk is accomplished by eliminating the deep pocket between the shaft and the disk. However, this modification results in an excessive stress concentration at the top of the shaft air hole due to the reduction in displacement attenuation between the disk hub and the area of the shaft where the hole is positioned.

BRIEF DESCRIPTION OF THE INVENTION

In one embodiment, a rotatable member of a turbine engine includes a substantially cylindrical shaft rotatable about a longitudinal axis, and a hub coupled to the cylindrical shaft through a conical shaft portion wherein the conical shaft portion includes a plurality of circumferentially-spaced air passages and wherein at least one of the plurality of air passages includes a non-circular cross section.

In another embodiment, a method of forming a turbine disk is provided. The turbine disk includes a hub coupled to a shaft portion, a radially outer rim, and a web extending therebetween. The method includes determining a first blade slot depth for receiving blades on the turbine disk, determining a second blade slot depth that facilitates reducing stress in the rim wherein the second blade slot depth is less then the first blade slot depth, forming the rim using the second slot depth, and forming the shaft portion that includes at least one air passage having a non-circular cross-section.

In yet another embodiment, a turbine engine system includes a disk rotatable about a longitudinal axis. The disk includes a hub coupled to a conical shaft portion that includes a plurality of circumferentially-spaced air passages wherein at least one of the plurality of air passages includes a non-circular cross section.

BRIEF DESCRIPTION OF THE DRAWINGS

FIGS. 1-5 show exemplary embodiments of the method and system described herein.

FIG. 1 is a cross-sectional view of a high pressure turbine first stage disk assembly and a second stage disk assembly of a high pressure turbine assembly in accordance with an exemplary embodiment of the present invention;

FIG. 2 is an enlarged cross-sectional view of the high pressure turbine first stage disk assembly and the second stage disk assembly shown in FIG. 1;

FIG. 3 is a side elevation view of the high pressure turbine first stage disk assembly in accordance with an exemplary embodiment of the present invention;

FIG. 4 is a schematic view of the air passage shown in FIG. 1 in accordance with an exemplary embodiment of the present invention;

DETAILED DESCRIPTION OF THE INVENTION

The following detailed description illustrates embodiments of the invention by way of example and not by way of limitation. It is contemplated that the invention has general application to embodiments of turbine engine components in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
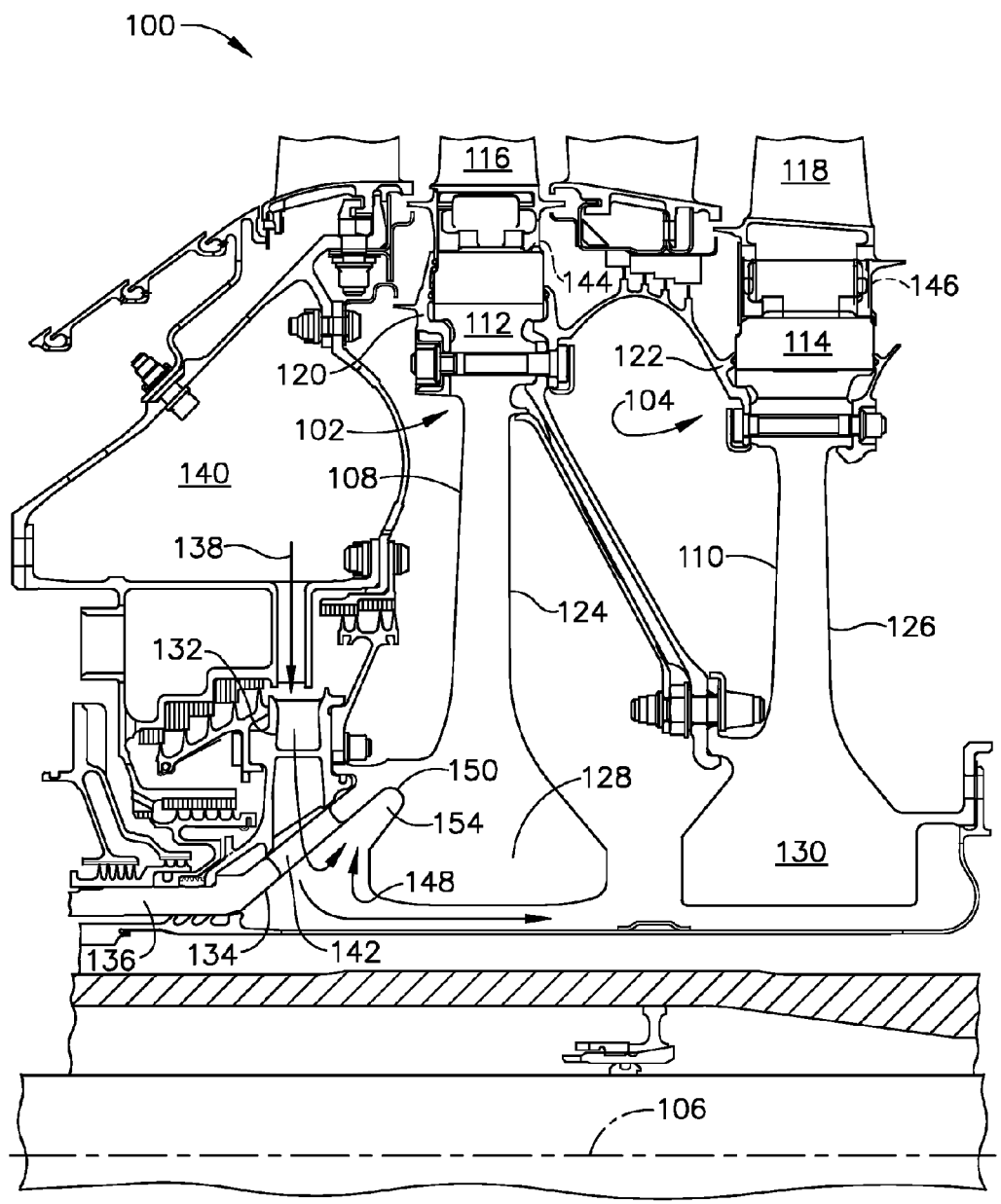

FIG. 1 is a cross-sectional view of a high pressure turbine assembly 100 in accordance with an exemplary embodiment of the present invention. In the exemplary embodiment, high pressure turbine assembly 100 includes a high pressure turbine first stage disk assembly 102 and a second stage disk assembly 104. First stage disk assembly 102 and second stage disk assembly 104 are circumscribed about an engine centerline 106 of a gas turbine engine such as a General Electric CF6-80 aircraft gas turbine engine. First and second stage disk assemblies 102 and 104 include first and second disks 108 and 110 having slotted first and second rims 112 and 114 which receive first and second turbine blades 116 and 118, respectively, in a dovetail fit. First and second blades 116 and 118 are axially retained within their respective first and second rims 112 and 114 by first forward and aft blade retainers 120 and second forward and aft blade retainers 122, respectively. First and second disks 108 and 110 include first and second webs 124 and 126 extending radially inwardly from first and second rims 112 and 114, to first and second hubs 128 and 130, respectively. First stage disk assembly 102 includes a cooling air deswirler 132 located radially outward from a conical shaft connection 134 to a substantially cylindrical shaft 136 extending axially forwardly from first hub 128 of disk 108. A flow of cooling air 138 is channeled from a high-pressure compressor discharge (not shown) through a cavity 140, deswirler 132, and through at least one of a plurality of air passages 142 that channels cooling air onboard disk assemblies 102 and 104. At least a portion of the flow of cooling air 138 is channeled to slots 144 and 146 in first and second rims 112 and 114. The flow of cooling air 138 is further channeled to blades 116 and 118 from slots 144 and 146. Because slots 144 and 146 form a portion of the cooling air circuit for cooling air to blades 116 and 118, a dimension of slots 144 and 146 is at least partially determinant of a head loss through the cooling circuit. For example, if a cross-sectional area of slots 144 and/or 146 is reduced in size, the flow of cooling air 138 to blades 116 and/or 118 may be reduced. In the exemplary embodiment, the cross-sectional area of slots 144 and/or 146 is reduced in size to facilitate reducing stress damage to first and second rims 112 and 114.

Air passages 142 also form a portion of the cooling circuit and as such a cross-sectional area of cooling passages 142 also affects the head loss in the cooling air circuit to blades 116 and/or 118. By increasing a cross-sectional area of air passages 142, head loss in the cooling circuit can be reduced thereby making up for the increased head loss due to reducing the size of slots 144 and 146. However, simply increasing the diameter of air passages 142 was determined to increase stress in an area of air passages 142 and hub 128.

Figure 2:
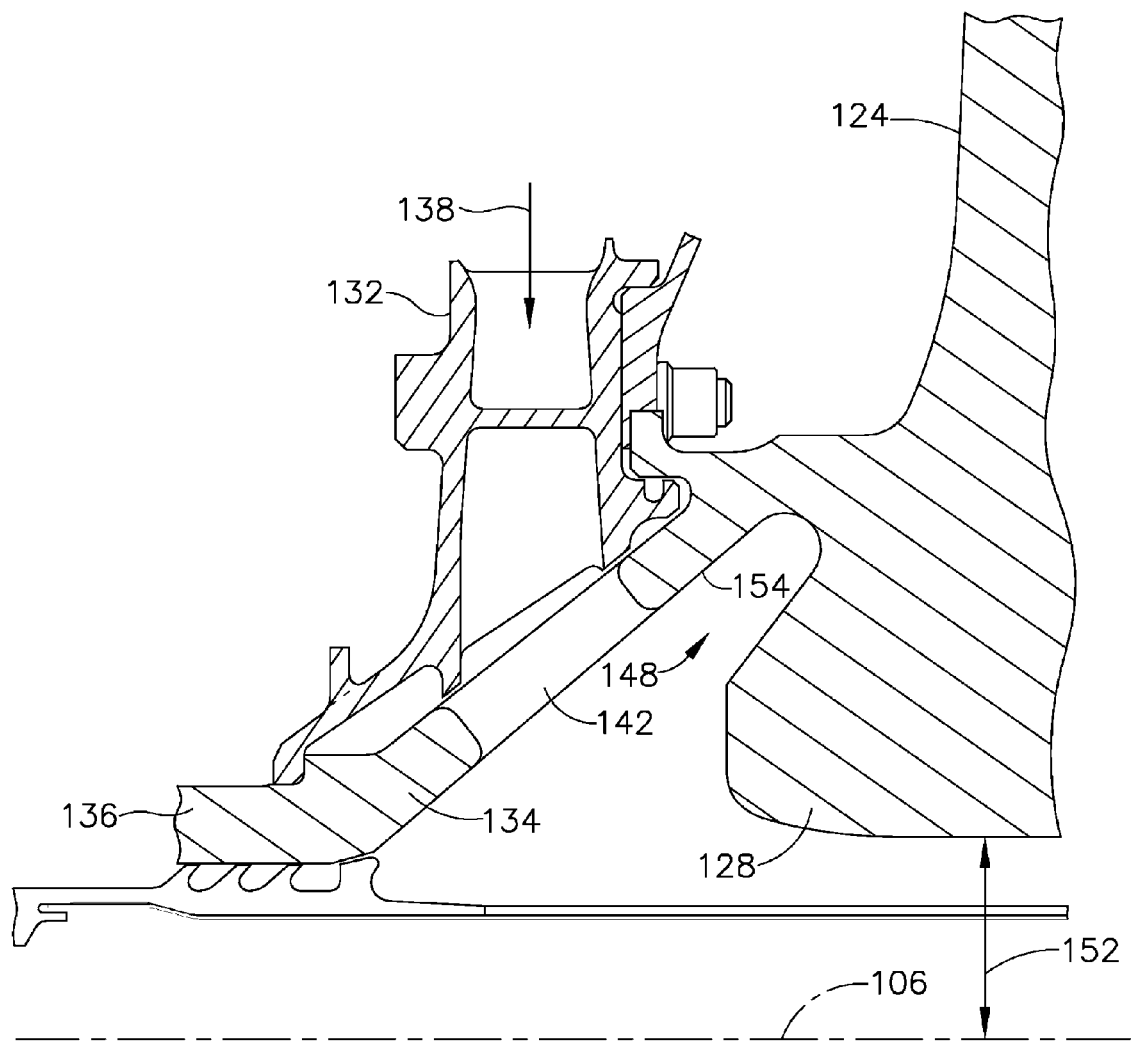

FIG. 2 is an enlarged cross-sectional view of high pressure turbine first stage disk assembly 102 and a second stage disk assembly 104 (shown in FIG. 1). An annular cavity 148 is formed between a conical connection 134 to the cylindrical shaft 136 and the first hub 128 and is closed at an intersection of conical connection 134 and first hub 128 and open and exposed to the flow of cooling air 138 passing through the cooling air deswirler 132 at an inner diameter (ID) 152 of the first hub 128. Dust and debris in the flow of cooling air 138 can become entrapped and build up in cavity 148 over time with continued operation of the engine. The flow of cooling air 138 has both axial and circumferential velocities relative to the rotating first hub 128. Debris entrained in the flow of cooling air 138 can circumferentially scrub rotating internal surfaces 154 of rotating first hub 128 and, over time, cause damage to the first hub 128 and first disk 108. Annular cavity 148 is formed as a deep pocket to provide significant attenuation from disk hub growth at the location of air passages 142. Removing this pocket to eliminate erosion of internal surfaces 154 decreases the attenuation at the location of air passages 142 (the location of air passages 142 is fixed by the location of deswirler 132). Air passages 142 are shaped and oriented to maintain sufficient attenuation and to ensure workable stresses. In the exemplary embodiment, air passages 142 are positioned in alignment with an outlet of deswirler 132 to act as an extension of the diffuser/impeller, allowing the walls of the holes to put work into the flow thereby increasing pressure and reducing the swirl of the flow of cooling air 138 relative to disk 108.

Figure 3:
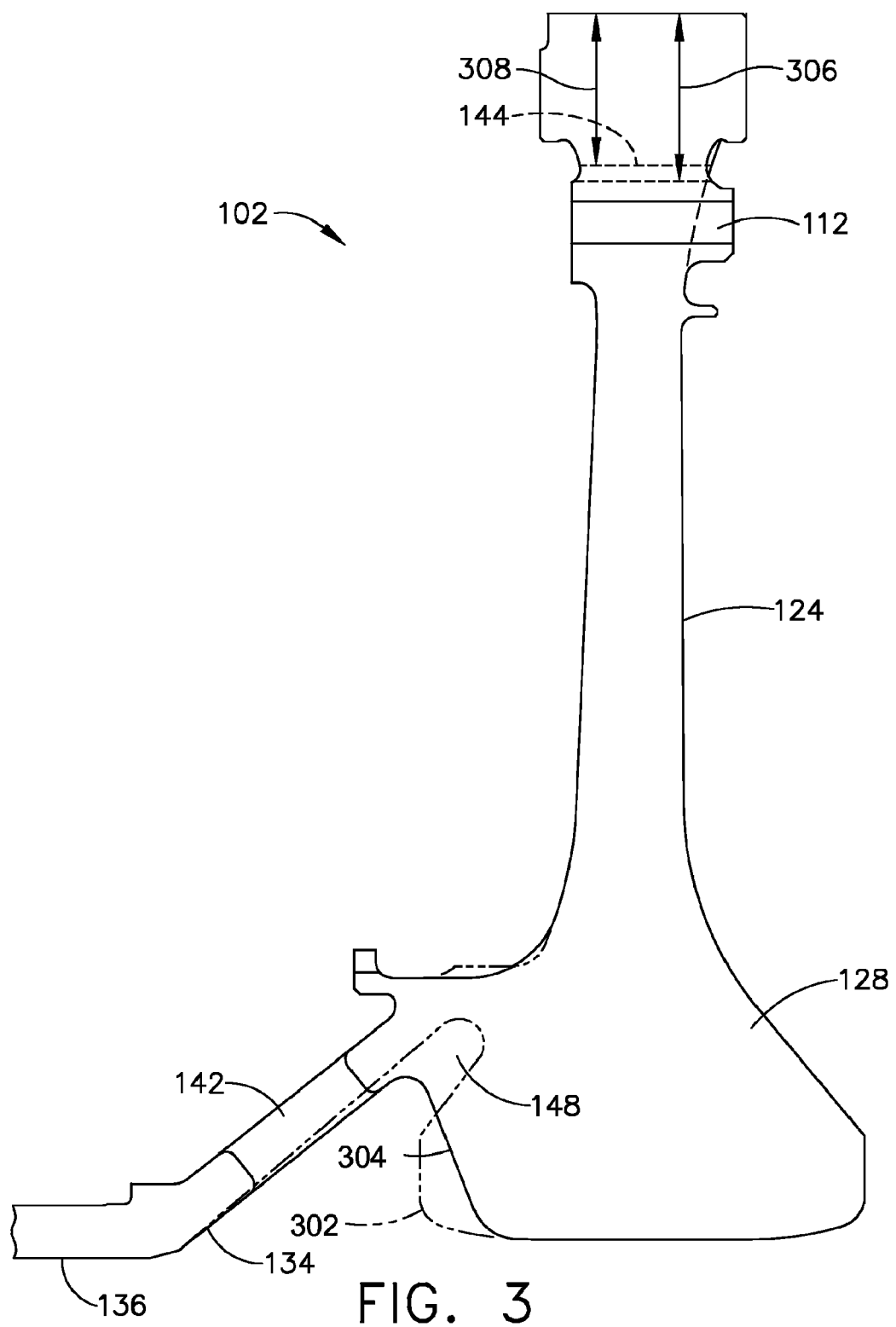

FIG. 3 is a side elevation view of high pressure turbine first stage disk assembly 102 in accordance with an exemplary embodiment of the present invention. Disk assembly 102 is shown in FIG. 3 as a first embodiment 302 in dashed lines superimposed on a second embodiment 304 in solid lines so that differences between a profile of second embodiment 304 and a profile of first embodiment 302 are more clearly apparent. First embodiment 302 includes rim slot 144 having a first depth 306. Second embodiment 304 includes rim slot 144 that has a second depth 308. In first embodiment 302, first depth 306 is at least partially responsible for increased stress in slot 144, which tends to shorten a life of disk assembly 102. By forming disk assembly 102 using second depth 308, which permits a larger slot bottom radius, stress in slot 144 is substantially reduced. However, a shallower depth of slot 144 also decreases a cross-sectional area of a cooling path in slot 144 and a reduced flow of cooling air 138 to blade 116 (shown in FIG. 1). Because of the increased life of disk assembly 102 provided by a shallower slot 144, the erosion in cavity 148 becomes a more life limiting area than the shallower slot 144 and presents a new problem to be solved.

A solution to the erosion problem is provided by eliminating the deep pocket of cavity 148. However, cavity 148 serves to improve attenuation of air passages 142 from the expansion of hub 128 due to centrifugal and thermal loads. To compensate for the reduction of the attenuation and to reduce stresses to an adequate level, the shape, position, and orientation of air passages are modified and to restore adequate cooling air pressure to blades 116 and/or 118, the area of air passages is increased.

Figure 4:
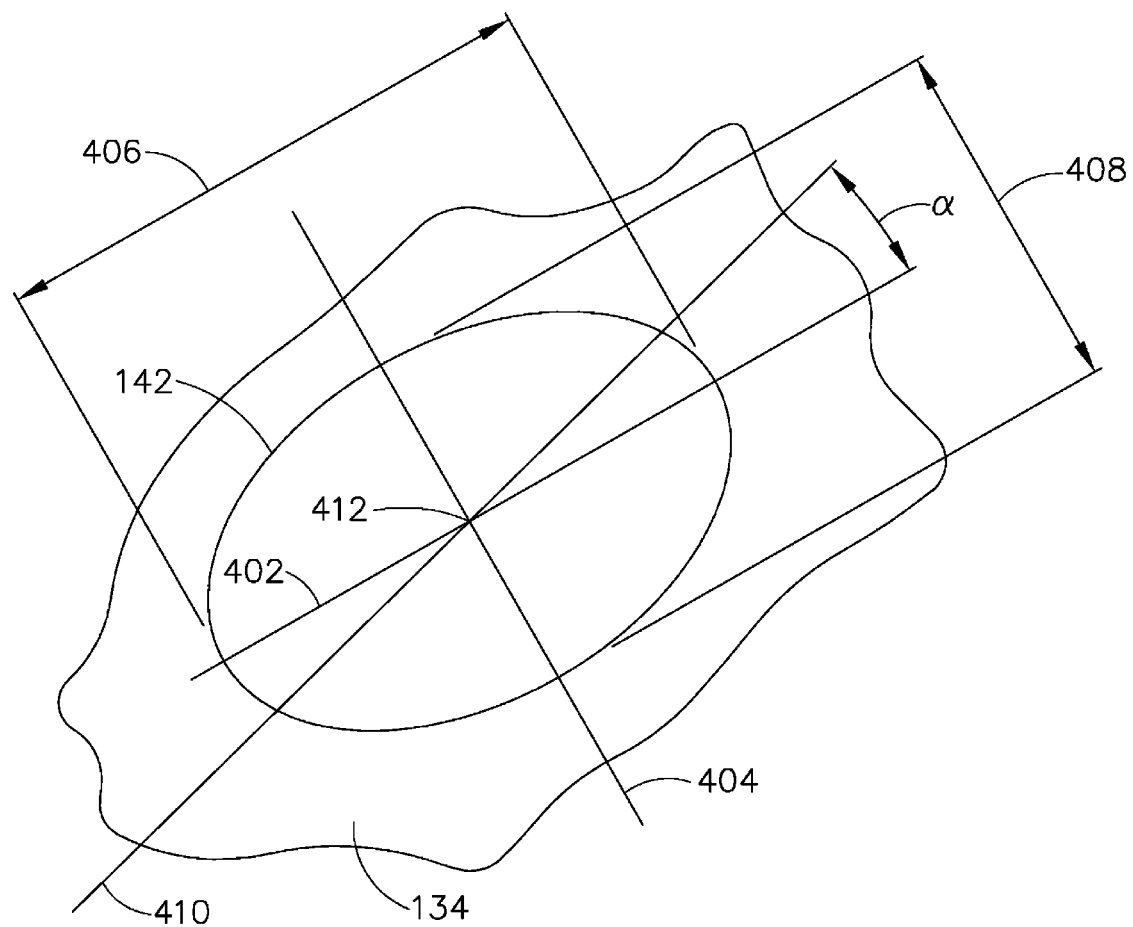

FIG. 4 is a schematic view of air passage 142 (shown in FIG. 1) in accordance with an exemplary embodiment of the present invention. In the exemplary embodiment, air passage 142 includes a non-circular shape, for example, but not limited to an elliptical shape. The elliptical shape of air passage 142 includes a major axis 402 and a minor axis 404. Air passage 142 has a width 406 across major axis and a depth 408 across minor access 404. A circumferential line 410 circumscribes conical shaft connection 134 at an axial location through a center 412 of the elliptical shape of air passage 142. Because conical shaft connection 134 transfers significant torque from the high pressure turbine (HPT) to a high pressure compressor (HPC), major axis of air passage 142 is canted by an angle α with respect to circumferential line 410. In one embodiment, angle α is an angle between five degrees and twenty degrees with respect to circumferential line 410. In another embodiment angle α is approximately fifteen degrees to maintain a highest stress peak proximate a center of major axis 402. This results in significant stress reduction and robustness for all operations (including the stresses due to torque) by maintaining the peak stress located on the largest radius possible and in the most advantageous position on the surface of air passage 142. The stress reduction obtained from newly shaped air passage 142 allowed for elimination of the shaft forward inner pocket cavity 148.

The elliptical shape of air passage 142 is able to achieve a greater opening area than a circular opening having an increased diameter without increasing peak hole stresses unacceptably proximate air passage 142. The greater opening area permits an improvement in the flow circuit pressure. In combination with eliminating the deep pocket cavity 148 it would not be possible to enlarge air passage 142 as a circular hole due to a lack of space in conical shaft connection 134 proximate hub 128. In addition, the non-circular shaped hole is sized, shaped, and oriented to act as a diffuser extension of deswirler 132 in that selecting the clocking position of a pattern of air passages 142 in relation to deswirler 132 permits control of the flow tangential mach number radially inward from air passage 142 facilitate pressure recovery.

Figure 5A:
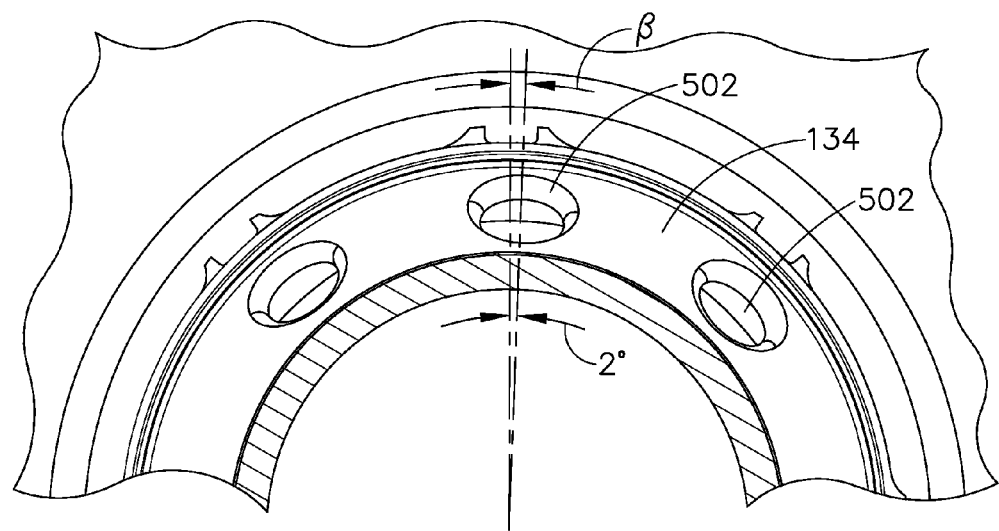
FIG. 5A is an aftward perspective view of the conical shaft connection shown in FIG. 1 including circular shaped holes.
Figure 5B:
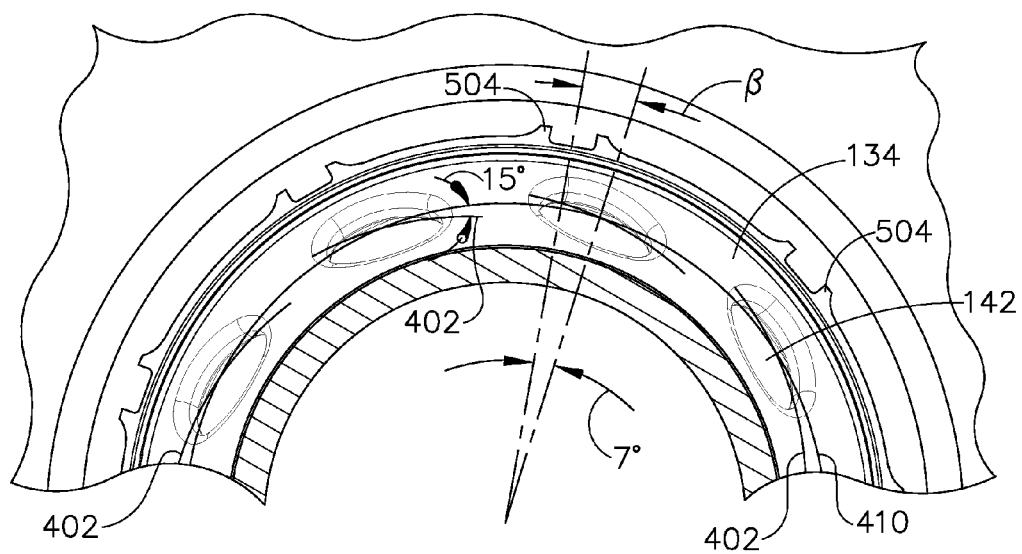
FIG. 5B is an aftward perspective view of the conical shaft connection shown in FIG. 1 in accordance with an exemplary embodiment of the present invention.

FIG. 5A is an aftward-looking perspective view of conical shaft connection 134 (shown in FIG. 1) including circular shaped holes 502. As illustrated in FIG. 5A, holes 502 are clocked approximately two degrees with respect to deswirler clips 504, which are indicative of a position of vanes of the deswirler when installed. FIG. 5B is an aftward perspective view of conical shaft connection 134 (shown in FIG. 1) in accordance with an exemplary embodiment of the present invention. In the exemplary embodiment, air passages 142 are elliptically-shaped passages that extend through conical shaft connection 134. Major axis 402 of air passages 142 are canted approximately fifteen degrees with respect to circumferential line 410. Air passages 142 are clocked approximately seven degrees with respect to a position of vanes in deswirler 132 when installed. Positions of a plurality of attachment clips 504 are indicative of the position of deswirler 132. An angle β represents an amount of the clocking position of center 412 in relation to deswirler 132. In one embodiment, angle β is between approximately three degrees and approximately fifteen degrees. In an alternative embodiment, angle β is approximately five degrees to approximately ten degrees. In the exemplary embodiment, angle β is approximately seven degrees. Setting angle β to approximately seven degrees also decreased the tangential Mach number to an acceptable value.

The above-described embodiments of a method and system of forming a turbine disk provides a cost-effective and reliable means for providing cooling to components of a turbine engine and reducing stress in such components. More specifically, the methods and systems described herein facilitate increases a life of components of a high pressure turbine disk assembly such that a life of the assembly as a whole is increased. As a result, the methods and systems described herein facilitate forming and operating turbine engines in a cost-effective and reliable manner.

An exemplary method and system for forming a turbine disk and maintaining are described above in detail. The apparatus illustrated is not limited to the specific embodiments described herein, but rather, components of each may be utilized independently and separately from other components described herein. Each system component can also be used in combination with other system components.

While the disclosure has been described in terms of various specific embodiments, it will be recognized that the disclosure can be practiced with modification within the spirit and scope of the claims.

What is claimed is:

1. A rotatable member of a turbine engine, said rotatable member comprising:
    a substantially cylindrical shaft rotatable about a longitudinal axis; and
    a hub coupled to said shaft through a conical shaft portion, said conical shaft portion comprising a plurality of circumferentially-spaced air passages, at least one of said plurality of air passages comprising a non-circular cross section comprising a major axis and a minor axis, said major axis is canted with respect to a circumferential line circumscribing said conical portion at a single axial position.

2. A rotatable member in accordance with claim 1 wherein said cross-section is elliptical.

3. A rotatable member in accordance with claim 1 wherein said rotatable member further comprises a radial diffuser, at least one of said plurality of air passages is clocked with respect to a vane of said diffuser.

4. A rotatable member in accordance with claim 1 wherein said rotatable member further comprises a radial diffuser, at least one of said plurality of air passages is clocked approximately three degrees to approximately fifteen degrees with respect to a vane of said diffuser.

5. A rotatable member in accordance with claim 4 wherein said rotatable member further comprises a radial diffuser, at least one of said plurality of air passages is clocked approximately five degrees to approximately ten degrees with respect to a vane of said diffuser.

6. A rotatable member in accordance with claim 5 wherein said rotatable member further comprises a radial diffuser, at least one of said plurality of air passages is clocked approximately seven degrees with respect to said radial diffuser.

7. A rotatable member in accordance with claim 1 wherein said rotatable member further comprises a radial diffuser, at least one of said plurality of air passages is radially aligned with a radially inner opening of a vane of said diffuser.

8. A rotatable member in accordance with claim 1 wherein said rotatable member further comprises a radial diffuser, at least one of said plurality of air passages is radially aligned with said diffuser such that a pressure of air channeled to the disk is facilitated being increased.

9. A method of forming a turbine disk including a hub coupled to a shaft portion, a radially outer rim and a web extending therebetween, said method comprising:
    determining a first blade slot depth for receiving blades on the turbine disk;
    determining a second blade slot depth that facilitates reducing stress in the rim wherein the second blade slot depth is less then the first blade slot depth;
    forming the rim using the second slot depth; and
    forming the shaft portion that includes at least one air passage having a non-circular cross-section including a major axis and a minor axis, the major axis of the non-circular cross-section aligned at an angle with respect to a circumferential line circumscribing the shaft portion at a single axial position.

10. A method in accordance with claim 9 wherein forming a shaft portion comprises forming a shaft portion that includes at least one air passage having an elliptical cross-section.

11. A method in accordance with claim 9 wherein the major axis of the elliptical cross-section is canted at an angle of between five degrees and twenty degrees with respect to a circumferential line circumscribing the shaft portion at a single axial position.

12. A method in accordance with claim 9 wherein the major axis of the elliptical cross-section is canted at an angle of approximately fifteen degrees with respect to a circumferential line circumscribing the shaft portion at a single axial position.

13. A method in accordance with claim 9 wherein the turbine disk further includes a radial diffuser and wherein forming a shaft portion that includes at least one air passage having a non-circular cross-section comprises forming at least one air passage in a position that is clocked with respect to a vane of the radial diffuser.

14. A method in accordance with claim 13 wherein forming at least one air passage in a position that is clocked with respect to a vane of the radial diffuser comprises forming the at least one air passage in a position that is radially aligned with a radially inner opening of a vane of the radial diffuser.

15. A turbine engine system comprising a disk rotatable about a longitudinal axis, said disk comprising a hub coupled to a conical shaft portion, said conical shaft portion comprising a plurality of circumferentially-spaced air passages, at least one of said plurality of air passages comprising a non-circular cross section, said cross-section comprising a major axis and a minor axis, said major axis being canted with respect to a circumferential line circumscribing said conical portion at a single axial position.

16. A turbine engine system in accordance with claim 15 wherein said cross-section is elliptical.

17. A turbine engine system in accordance with claim 15 wherein said conical portion further comprises a radial diffuser, at least one of said plurality of air passages is clocked with respect to a vane of said diffuser.

* * * * *